UNITED STATES PATENT OFFICE.

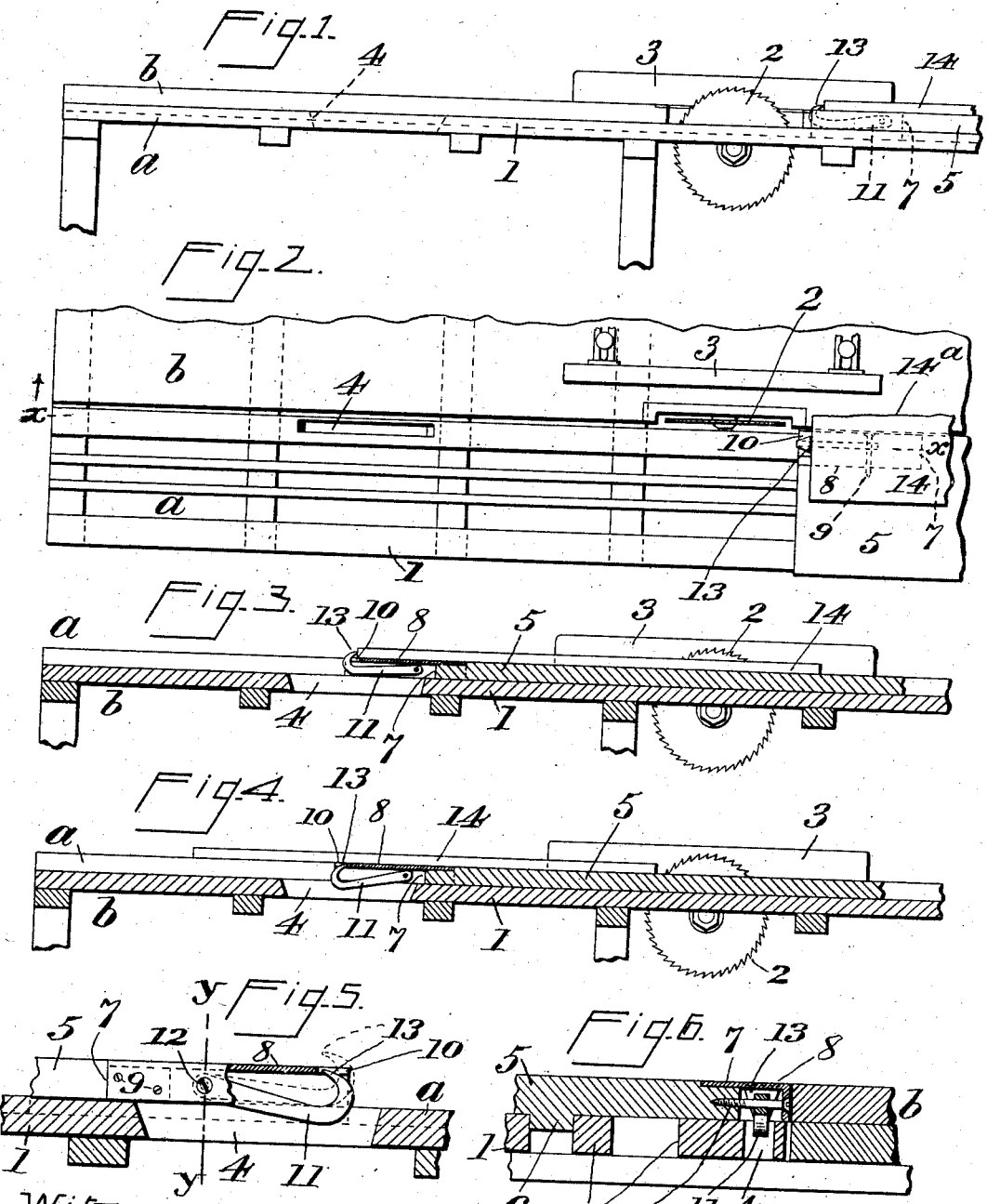

GEORGE J. SCHALLER, OF COVINGTON, KENTUCKY, AND VICTOR B. ADAMS, OF CINCINNATI, OHIO.

RIP-SAW.

No. 883,671.     Specification of Letters Patent.     Patented March 31, 1908.

Application filed July 13, 1907. Serial No. 383,697.

*To all whom it may concern:*

Be it known that we, GEORGE J. SCHALLER and VICTOR B. ADAMS, citizens of the United States, and residents, respectively, of Covington, Kenton county, State of Kentucky, and Cincinnati, Hamilton county, and State of Ohio, have invented certain new and useful Improvements in Rip-Saws, of which the following is a specification.

This invention relates to improvements in rip-saws and, more particularly speaking, to circular rip-saws having a shooting-board on which the lumber to be trimmed or cut lengthwise is placed and carried to the saw, and one object of the invention is to provide in connection with the fore end of the shooting-board of a circular rip-saw a pivotal gravitating dog or hook, the latter adapted to operate automatically to and from engaging contact with the end of the stuff that is being carried to and from the saw in the ripping operation.

A further object of the invention is to provide in connection with a shooting-board, having its forward edge or corner, on the saw side, suitably recessed or shouldered, a boxing or casing in the recess and a pivotal dog mounted in said casing with its hooked end or tusk disposed upwardly and adapted to automatically contact with and release from the end of the lumber being acted upon by the rip-saw in the machine of which the shooting-board forms a part.

In the accompanying sheet of drawings, which serve to illustrate the invention, Figure 1 is a fragmentary longitudinal elevation of a rip-saw, showing our invention therein, the shooting-board being in position just ahead of the saw and ready for a cutting stroke on stuff placed on said shooting-board; Fig. 2, a fragmentary plan view of Fig. 1; Fig. 3, a longitudinal sectional elevation taken on the line $x$, $x$, of Fig. 2, but with the shooting-board advanced up to the releasing position of the gravitating dog or hook and with the lumber or stuff on the shooting-board sawed almost its full length; Fig. 4, a view similar to Fig. 3, and on the same sectional line, but showing the dog in its released position and the stuff or lumber freed from said dog and in the position it occupies after having just passed through the saw; Fig. 5, a fragmentary sectional elevation of the table and the fore end of the shooting-board, showing the gravitating dog in its lowered or dropped position, the casing for said dog and, also, the said dog in dotted-lines in its uppermost operating position, but with no stuff or lumber shown therein; and Fig 6, a transverse section, taken on the line $y$, $y$, of Fig. 5, of the table, shooting-board, dog and the casing for the dog.

In said drawings, 1 indicates the bench or table, 2 a circular-saw suitably journaled or mounted therein, 3 the customary longitudinal gage adjustably mounted on the table adjacent said saw, 4 a longitudinal slot made in the table a suitable distance forward of said saw, and 5 a shooting-board suitably mounted upon and reciprocated or drawn to and fro over said table in parallel relation to the face of said saw. Thus far the rip-saw machine is made as customary, except in the single provision of the slot 4, the purpose of which we will presently describe. That part of the table over which the shooting-board passes to and fro or reciprocates, is made slatted and a tongue 6 is provided on the bottom of the shooting-board, as best shown in Fig. 6, such tongue engaging the space between two of the slats of the table to properly guide the shooting-board in a straight line parallel to the saw. To still further preserve the parallelism of the shooting-board, as customary, the slatted portion of the table is made at a lower level than the solid portion of the table, such slatted portion being indicated at $a$ and the solid portion at $b$, in Fig. 2 and, also, so designated in the remaining figures of the drawing. The slatted portion of the table forms the usual race-way for the shooting-board on the table or bench of the machine.

The fore inner corner of the shooting-board is recessed or shouldered at 7 and a hollow metal casing or box 8 is made to fit and coincide with said recess 7, screws 9 being used to secure said casing to the shooting-board. The box or casing 8 is best shown in Figs. 5 and 6, and it has an open bottom and, also, an opening 10 in its fore edge.

11 indicates a dog or claw pivotally mounted on a transverse screw 12 at its rear end in the box or casing 8 and with its outer end or tusk 13 disposed upwardly and adapted to move in a short arc in and above the opening 10 in said casing 8. This dog forms a claw or tusk for use in holding the lumber or stuff at its fore end on the shooting-board when said lumber is to be carried to and from the saw in the ripping operation.

In the operation of our device, the shooting-board, with the dog resting on the surface of the table and the claw or hook end 13 above the plane of the shooting-board and the fore end of the stuff or timber 14 in contact with said tusk, is arranged on the slatted portion of the table just ahead of the saw ready for a forward sliding movement by the hand of the operator. The shooting-board having been slid forward up to the position shown in Fig. 3, wherein its fore edge and the entire dog rest or lie above the slot 4, the stuff 14 is retracted very slightly and sufficient only to permit the dog to gravitate into the position seen in Fig. 4, the tusk of said dog dropping just below the plane of the shooting-board so that the stuff 14 can then pass and be continued on forward through the saw and passing freely over said tusk. The condition of the stuff or timber 14 seen in Fig. 2 is its ordinary initial one, in which it has a ragged or rough edge 14$^a$ that is first ripped off by the saw in the usual manner, but with the fore end of the stuff in contact with the raised tusk 13 to prevent it from slipping lengthwise on the shooting-board in the forward movement of the latter that carries it through the saw.

It will be seen that the dog is automatically released from the fore end of the stuff 14 when the shooting-board has advanced sufficient to bring said dog over the slot 4 and said dog is automatically forced or brought upward with its tusk above the plane of the shooting-board, when the latter is drawn backward along its race-way on the table 1. The timber 14 must, as a matter of course, be drawn backward on the shooting-board before the tusk-end of the dog can properly rise above the plane of the shooting-board, the lower edge of the dog riding along the rear upper edge of the slot 4 in the rising movement of said dog to active detent or stop position.

The presence and provision of the automatically moving dog enables the operator to stand in one position to the rear of the saw for feeding the stuff up to its cutting edge and moving the shooting-board to and fro along the table. It is thus not necessary for said operator to go forward to place the dog in stop or detent position for a forward stroke of the shooting-board, or to go to the fore end of the shooting-board to release the dog when the stuff 14 is to be handled for another cut or ripping thereof. The metal boxing for the dog is very simple and easily applied and protects the fore inner corner of the shooting-board against wear and tear.

We claim:—

1. In a rip-sawing machine, a table, a saw, a shooting-board, a gravitating dog mounted in the fore end of said shooting-board and a longitudinal slot in the table, said dog being held up by contact with the table and adapted to drop into said slot at the fore end of the stroke of the shooting-board to automatically release the stuff or timber acted upon by the saw.

2. In a rip-sawing machine, a table having a race-way and a longitudinal slot in said race-way, a circular saw suitably journaled in the table in suitable relation to said race-way, a shooting-board on said race-way and having a shoulder or recess at its fore inner corner, a metal box or casing having an open bottom and secured in said recess at the fore end of the shooting-board and a gravitating dog mounted in said box or casing with its claw or tusk disposed upwardly and adapted to vertically engage the slot in the table.

GEORGE J. SCHALLER.
VICTOR B. ADAMS.

Witnesses:
JOHN ELIAS JONES,
NORMA KEISER.